(12) United States Patent
Chaudhuri et al.

(10) Patent No.: US 8,884,989 B2
(45) Date of Patent: Nov. 11, 2014

(54) SYSTEM AND METHOD FOR FUSING IMAGES

(75) Inventors: Subhasis Chaudhuri, Mumbai (IN);
Ketan Kotwal, Mumbai (IN);
Shanmuganathan Raman, Tamil Nadu (IN)

(73) Assignee: Indian Institute of Technology Bombay, Powai, Mumbai (IN)

( * ) Notice: Subject to any disclaimer, the term of this patent is extended or adjusted under 35 U.S.C. 154(b) by 867 days.

(21) Appl. No.: 12/703,594

(22) Filed: Feb. 10, 2010

(65) Prior Publication Data
US 2011/0147588 A1     Jun. 23, 2011

(30) Foreign Application Priority Data
Dec. 23, 2009   (IN) .......................... 2981/MUM/2009

(51) Int. Cl.
*G09G 5/00*    (2006.01)
*G06T 5/50*    (2006.01)

(52) U.S. Cl.
CPC ......... *G06T 5/50* (2013.01); *G06T 2207/20221* (2013.01); *G06T 2207/10036* (2013.01)
USPC .......................................... 345/634; 600/466

(58) Field of Classification Search
None
See application file for complete search history.

(56) References Cited

U.S. PATENT DOCUMENTS

| | | | |
|---|---|---|---|
| 4,718,104 A * | 1/1988 | Anderson .................. | 382/240 |
| 5,488,674 A * | 1/1996 | Burt et al. ................ | 382/284 |
| 2004/0130630 A1 | 7/2004 | Ostromek | |
| 2006/0004275 A1 | 1/2006 | Vija et al. | |
| 2007/0071362 A1 * | 3/2007 | Milanfar et al. ............ | 382/299 |
| 2007/0177819 A1 | 8/2007 | Ma et al. | |
| 2008/0129752 A1 | 6/2008 | Riley et al. | |
| 2008/0226151 A1 * | 9/2008 | Zouridakis et al. ......... | 382/133 |
| 2010/0080429 A1 * | 4/2010 | Li .............................. | 382/131 |

FOREIGN PATENT DOCUMENTS

| | | |
|---|---|---|
| JP | 11-154220 A | 6/1999 |
| JP | 2005-114530 A | 4/2005 |
| JP | 2010-511256 A | 4/2010 |
| WO | 2008/070542 A1 | 6/2008 |

OTHER PUBLICATIONS

Alexander Toet, "Hierarchical Image Fusion", Machine Vision and Application, 1990.*
Kotwal, K. and Chaudhuri S., "Visualization of Hyperspectral Images Using Bilateral Filtering", IEEE Transactions on Geoscience and Remote Sensing, May 2010, vol. 48, Issue 5, pp. 2308-2316.
International Search Report and Written Opinion prepared by the Australian Patent Office for PCT/IB2010/002877 mailed on Mar. 21, 2011.
A. Toet, "Hierarchical Image Fusion", Machine Vision and Applications, 1990, vol. 3, pp. 1-11.

* cited by examiner

*Primary Examiner* — David Zarka
*Assistant Examiner* — David H Chu
(74) *Attorney, Agent, or Firm* — Brundidge & Stanger, P.C.

(57) ABSTRACT

A system and method for generating a fused image is provided. The system comprises processing circuitry configured to access a plurality of images, group the images into a plurality of sets, fuse the images of each set to form a plurality of fused images and fuse the fused images to form a final fused image.

18 Claims, 3 Drawing Sheets

SYSTEM AND METHOD FOR FUSING IMAGES

CROSS-REFERENCE TO RELATED APPLICATIONS

This application claims priority to Indian Patent Application Serial No. 2981/MUM/2009 filed Dec. 23, 2009, the contents of which are incorporated by reference herein in its entirety.

BACKGROUND OF THE INVENTION

In many image processing applications, such as hyperspectral image applications, several image sensors are employed to obtain images of a region of interest. Such images usually present abundant multidimensional information which contains several image bands. Typically, these images are fused together to form a single image. The single fused image contains features extracted from all the images that were originally received.

There are several image fusion techniques that can be applied to combine multiple images with varying information into one fused image. Specifically, in hyperspectral image applications, where several hundreds of images may be required to be fused into one image, image fusion techniques of multiband image fusion are employed. In the multiband image fusion technique, several images of the same spatial resolution are combined to form a single image.

Several challenges exist while fusing multiple images into a single image Computational costs of processing can be high because of the large number of image bands present in the image set. In addition, storing the images requires larger memory as a single hyperspectral image dataset may contain a large number of image bands. Specifically, in hyperspectral applications, nearby image bands in the hyperspectral data cube exhibit a high degree of spatial correlation amongst them due to the contiguous and narrow nature of the sensors. Redundant data need to be removed for the efficient processing and reduction in the computational overheads.

BRIEF SUMMARY OF THE INVENTION

Briefly, according to one embodiment of the present technique, a method for generating a fused image is provided. The method comprises accessing a plurality of images, grouping the images into a plurality of sets, fusing images of each set to form a plurality of fused images and fusing the fused images to form a final fused image.

In another embodiment, a system for generating a fused image is provided. The system comprises accessing a plurality of images, grouping the images into a plurality of sets at a first hierarchical level and fusing the images of each set at the first hierarchical level. The method further comprises grouping the fused images from the first hierarchical level to form sets of images at a second hierarchical level, fusing the images of each set at the second hierarchical level and continuing the grouping and fusing at higher hierarchical levels until a single fused image is obtained.

In another embodiment, an image processing system for fusing a plurality of images is provided. The system comprises processing circuitry configured to access a plurality of images, group the images into a plurality of sets, fuse the images of each set to form a plurality of fused images and fuse the fused images to form a final fused image.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE INVENTION

Figure 1:
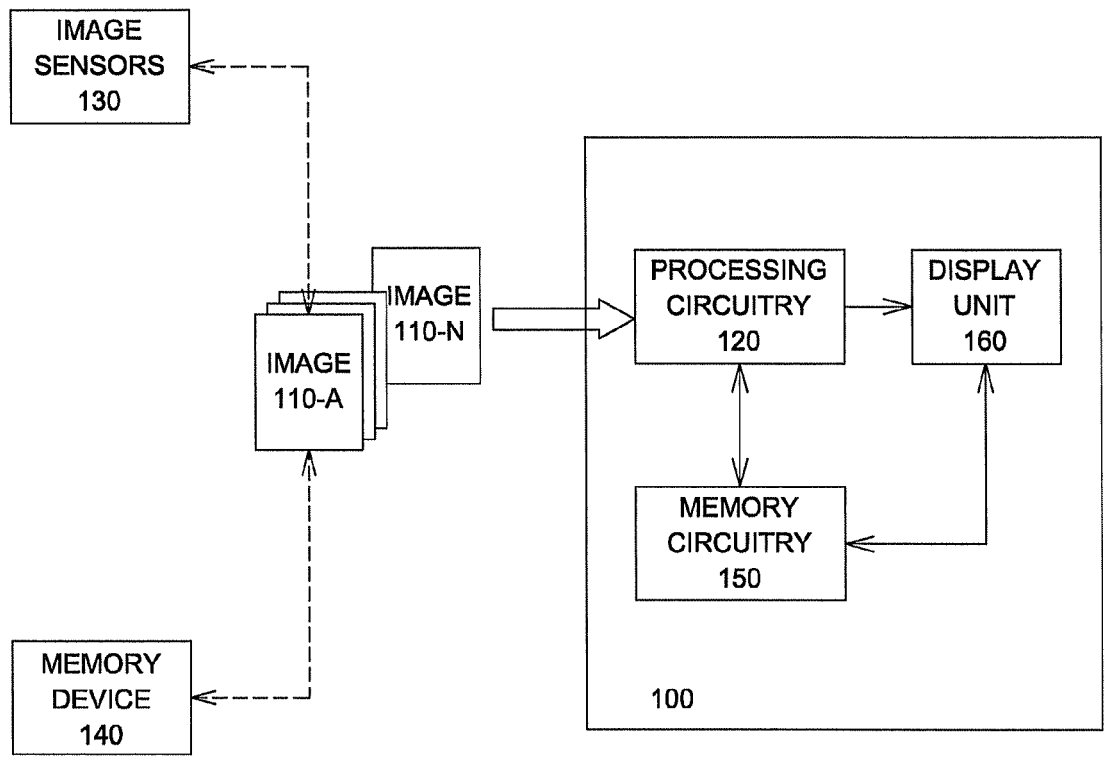
FIG. 1 is a block diagram of an example imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments are generally directed to fusing of multiple images. The technique provides a method for generating a single fused image from multiple images by hierarchically fusing sets of images as described. The following sections are described with reference to hyperspectral images, however it should be understood that the techniques described herein may be applied in various other image processing applications such as medical image processing, security systems, and the like.

FIG. 1 is a block diagram of an example imaging system. Imaging system 100 comprises processing circuitry 120, memory circuitry 150 and display unit 160. In the illustrated embodiment, the plurality of images 110-A through 110-N are hyperspectral images of a hyperspectral image cube. Each block is described in further detail below.

Processing circuitry 120 includes one or more processors (not shown) configured to access a plurality of images 110-A through 110-N. The images may be accessed from image sensors 130 or from an external memory device 140. In one embodiment, the image sensors 130 comprise hyperspectral imaging sensors that provide high resolution spectral images covering the visible light as well as infrared wavelength spectra.

Processing circuitry is configured to fuse the plurality of images into a final fused image using a hierarchical fusion technique. In the hierarchical fusion technique, the plurality of images is first grouped into a plurality of sets. The number of images in each set may be equal or different.

At a first stage, the images of each set are fused to form a plurality of fused images. The plurality of fused images is further grouped into several sets. The images in each set are then fused in a second stage to form a second plurality of fused images. The process of grouping and fusing is continued until a final fused image is obtained.

In an example embodiment, the processing circuitry 120 is configured to fuse the images based on weights computed for each image 110-A through 110-N. The processing circuitry is also configured to perform pre-processing operations such as filtering the images prior to fusing the images.

Since the processing circuitry fuses the images in groups at each stage, the memory requirement for the imaging system is reduced substantially. Also, due to the progressively smaller numbers of images that need to be processed at each stage, the computational complexity of fusing images is substantially reduced.

Memory circuitry 150 is configured to store the final fused image. In one embodiment, the memory circuit is configured to store intermediate fused images and the final fused image. In one embodiment, the processing circuitry may be configured to access intermediate the fused images without accessing the final fused image.

The memory circuitry 150 (and the external memory 140) may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth. Display unit 160 is configured to display the fused image. Examples of display units include LCD/LED display systems, cathode ray tubes, projector display units and the like. As described above, the processing circuitry is configured to fuse the images using a hierarchical fusion technique as described in further detail below.

Figure 2:
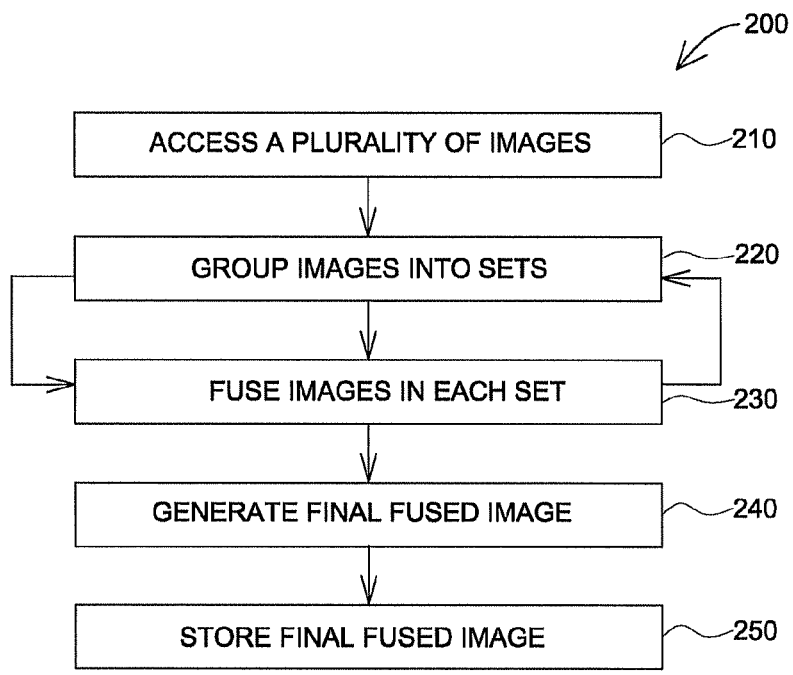
FIG. 2 is a flow chart illustrating one method for fusing multiple images into a single image.

FIG. 2 is a flow chart illustrating an example technique by which the plurality of images is fused to form a single image. At step 210, a plurality of images is accessed. The images may be accessed directly from the image sensors or from a memory device. In one embodiment, the plurality of images includes hyperspectral images. As used herein, hyperspectral images refer to images acquired by one or more image sensors at different wavelengths across the electromagnetic spectrum. At step 220, the images are grouped into a plurality of sets. In one embodiment, the sets have equal number of images. In another embodiment, at least two sets have unequal numbers of images.

At step 230, the images of each set are fused to form a plurality of fused images. In one embodiment, the images are fused by computing a weight for each image in the set, and then fusing the images based on their individual weights. Steps 220 and 230 may be performed iteratively until a final fused image is obtained at step 240.

At step 250, the final fused image is stored in a memory circuit. In one embodiment, the fused images generated at step 230 and the final fused image generated at step 240 is stored in the memory circuit. The manner in which the images are fused is described in detail with reference to the example below.

Figure 3:
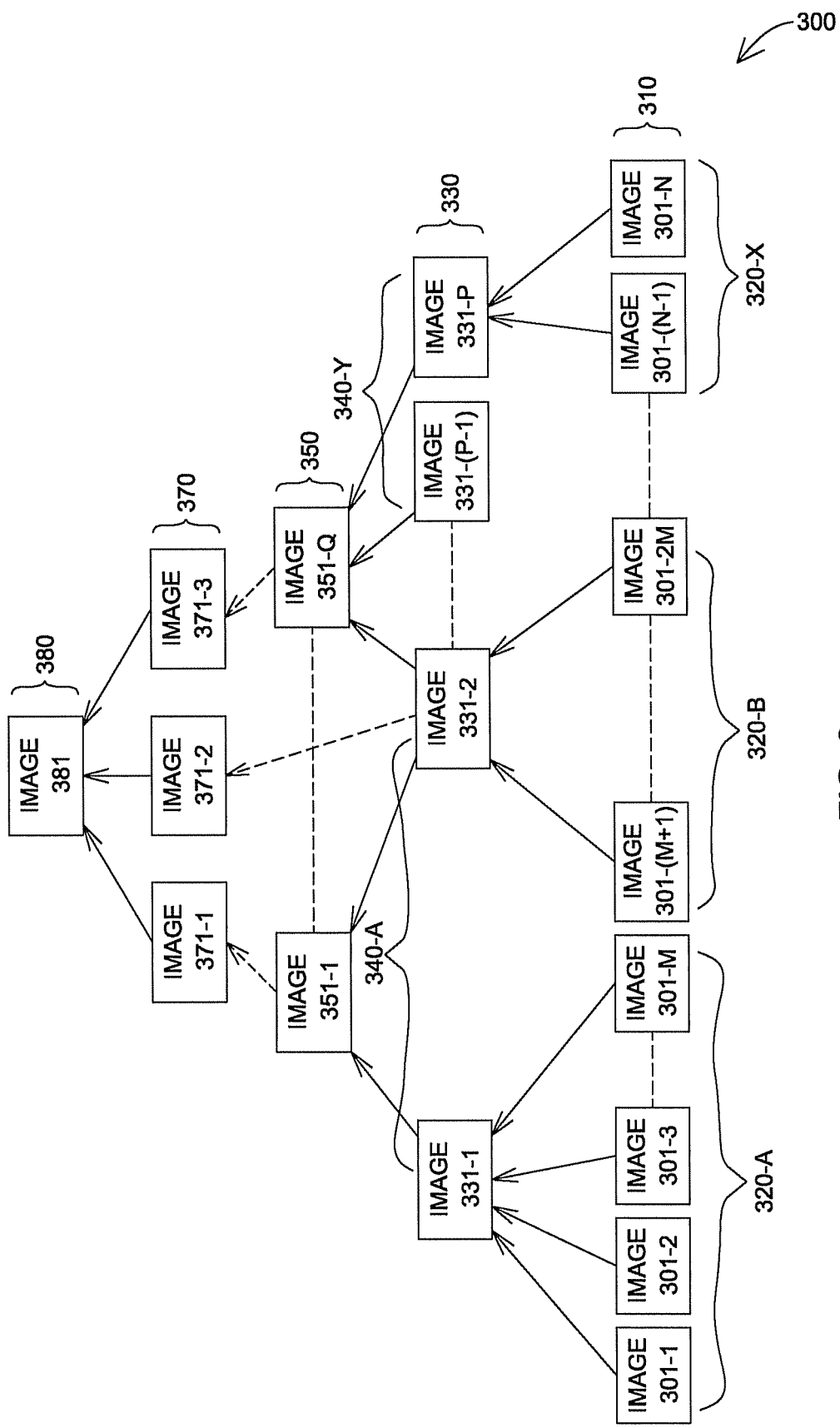
FIG. 3 is a diagrammatic view of implementing an example hierarchical fusion technique for fusing images into a single image.

FIG. 3 is a diagrammatic view depicting one embodiment of a hierarchical fusion technique. The hierarchical fusion technique 300 can be implemented to fuse a plurality of images 301-1 through 301-N. At the initial level 310, the images can be grouped into sets 320-A through 320-X. In one embodiment, each set has 'M' number of images.

At an hierarchical level, referred to in this example as the first hierarchical level 330, the images in each set 320-A through 320-X are fused to form a corresponding plurality of images 331-1 through 331-P. These images are again grouped into sets 340-A through 340-Y. The images in each set 340-A through 340-Y are fused again at a second hierarchical level 350. The second hierarchical level includes a plurality of fused images 351-1 through 351-Q. In this example embodiment, the grouping and fusing at higher hierarchical levels continues till a single fused image 381 is obtained at the final hierarchical level 380.

In the example embodiment illustrated in FIG. 3, the pre-final hierarchical level 370 comprises three images 371-1 to 371-3. As used herein, the pre-final hierarchical level refers to a level just before the final hierarchical level. Each image represents a fused image of approximately one third of the total available wavelength bandwidth. By generating three fused images at the pre-final stage and assigning them to appropriate color channels, such as red, green and blue, an RGB representation of the hyperspectral image cube for tristimulus visualization is obtained.

The above-described technique provides several advantages such as the effective utilization of the memory and reduced computational complexity. For example, for a set of 'N' images, only 'M' images are read into the memory. The resultant fused images at the intermediate stages facilitate the visualization and analysis of midband reflectance response of the scene. Thus, if '$\delta$' is the bandwidth of the individual narrow bands of the hyperspectral image set, then 'M$\delta$' is the bandwidth of each of the fused image in the first stage.

Also, in case of hyperspectral images used in remote sensing applications, the resultant fused images at the intermediate hierarchical levels facilitate the visualization and analysis of midband reflectance response of the imaged area. The images obtained from the above described technique contain the response over a wider bandwidth while moving to the higher levels. For example, each image at the pre-final stage 370 encompasses approximately one third of the bandwidth of the total range of hyperspectral bandwidth. The final fused image represents the fusion over the entire bandwidth of the available data. In additional, the present technique reduces computational complexity by processing only a few images at a time.

Figure 4:
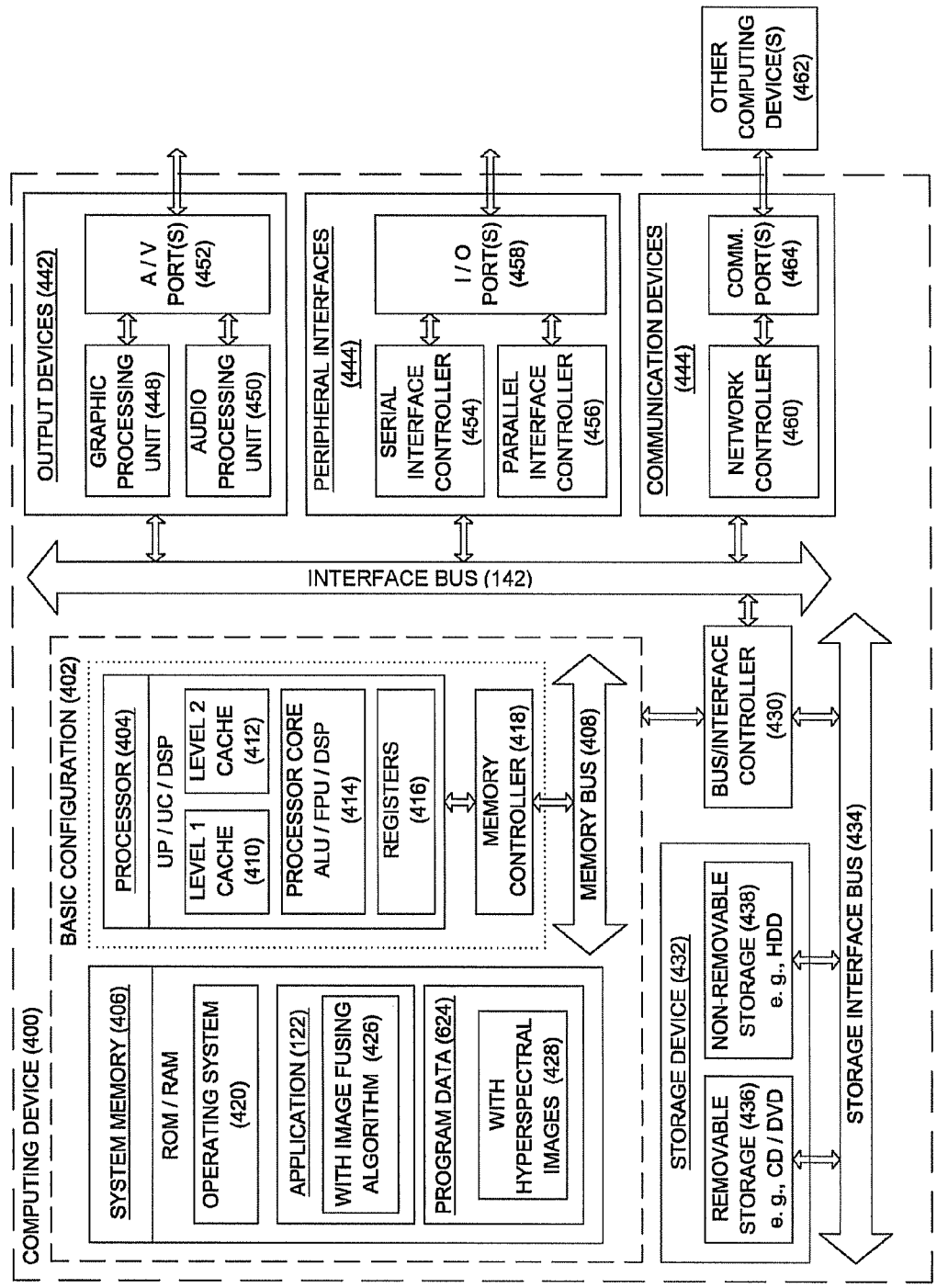
FIG. 4 is a block diagram of an embodiment of a computing device.

FIG. 4 is a block diagram illustrating an example computing device 400 that is arranged for generating a fused image from a plurality of images in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an image fusing algorithm 426 that is arranged to generate a single fused image from a plurality of images. Program data 424 may include images that are to be fused into a single image which may be useful for various applications such as image processing as is described herein. In some embodiments, application 422 may be arranged to operate with program data 424 on operating system 420 such that a fused image is generated from a set of images. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   accessing, by a computing device, a plurality of images;
   grouping, by the computing device, the plurality of images into a plurality of sets based on a computed weight for each image in the plurality of images in each set of the plurality of sets at a first hierarchical level;
   fusing, by the computing device, images of the each set of the plurality of sets at the first hierarchical level to form a higher hierarchical level including a plurality of fused images;
   continuing, by the computing device, the grouping and the fusing at the higher hierarchical level based on a computed weight for each image in the higher hierarchical level until a single fused image is obtained for each predetermined channel; and
   fusing, by the computing device, the single fused image for the each predetermined channel to form a final fused image;
   wherein the single fused image for the each predetermined channel includes an available wavelength bandwidth proportional to a number of fused images in the single fused image for the each predetermined channel and a total wavelength bandwidth of the single fused image.

2. The method of claim 1, wherein the fusing comprises:
   computing a weight for each image in the plurality of sets, and
   fusing the images in the each set of the plurality of sets based on the computed weight of the each image.

3. The method of claim 1, wherein a number of the images of each set of plurality of sets includes an equal number of images.

4. The method of claim 1, wherein at least two sets of images have different numbers of images.

5. The method of claim 1, further comprising accessing, by the computing device, a stored fused image without accessing a final fused image.

6. A system comprising:
   processing circuitry configured to:
   access a plurality of images,
   group the plurality of images into a plurality of sets based on a computed weight for each image in the plurality of images at a first hierarchical level;
   fuse images of each set of the plurality of sets to form a higher hierarchical level that includes a plurality of fused images;
   continue to group and fuse at the higher hierarchical level based on a computed weight for each image in the higher hierarchical level until a single fused image is obtained for each predetermined channel;
   fuse the single fused images for the each predetermined channel to form a final fused image;
   wherein each of the second plurality of fused images and the first fused image includes an available wavelength bandwidth proportional to a number of fused images in the second plurality of fused images and the first fused image and a total wavelength bandwidth of the final fused image.

7. The system of claim 6, wherein the processing circuitry is further configured to compute a weight for each image in the plurality of sets.

8. The system of claim 6, wherein the each set of the plurality of sets includes an equal number of images.

9. The system of claim 6, wherein at least two sets of images include different numbers of images.

10. The system of claim 6, further comprising memory circuitry configured to store the final fused image.

11. The system of claim 10, wherein the memory circuitry is further configured to store the first and second plurality of fused images.

12. The system of claim 6, wherein the processing circuitry is further configured to access a stored fused image without accessing the final fused image.

13. The system of claim 6, wherein the plurality of images include hyperspectral images.

14. A non-transitory computer-readable medium storing executable instructions that, in response to being executed, cause a computing device to perform operations comprising:
   accessing, by the computing device, a plurality of images;
   grouping, by the computing device, the plurality of images into a plurality of sets based on a computed weight for each image in the plurality of images in each set of the plurality of sets at a first hierarchical level;
   fusing, by the computing device, images of the each set of the plurality of sets at the first hierarchical level to form a higher hierarchical level including a plurality of fused images;
   continuing, by the computing device, the grouping and the fusing at the higher hierarchical level based on a computed weight for each image in the higher hierarchical level until a single fused image is obtained for each predetermined channel; and fusing, by the computing device, the single fused image for the each predetermined channel to form a final fused image;

wherein the single fused image for the each predetermined channel includes an available wavelength bandwidth proportional to a number of fused images in the single fused image for the each predetermined channel and a total wavelength bandwidth of the single fused image.

15. The non-transitory computer-readable medium of claim 14, wherein the fusing comprises:

computing a weight for each image in the plurality of sets, and fusing the images in the each set of the plurality of sets based on the computed weight of the each image.

16. The non-transitory computer-readable medium of claim 14, wherein a number of the images of each set of plurality of sets includes an equal number of images.

17. The non-transitory computer-readable medium of claim 14, wherein at least two sets of images have different numbers of images.

18. The non-transitory computer-readable medium of claim 14, further comprising accessing, by the computing device, a stored fused image without accessing a final fused image.

* * * * *

UNITED STATES PATENT AND TRADEMARK OFFICE
CERTIFICATE OF CORRECTION

PATENT NO.           : 8,884,989 B2                                      Page 1 of 1
APPLICATION NO.      : 12/703594
DATED                : November 11, 2014
INVENTOR(S)          : Chaudhuri et al.

It is certified that error appears in the above-identified patent and that said Letters Patent is hereby corrected as shown below:

In the Claims

In Column 8, Line 9, in Claim 3, delete "of each" and insert -- of the each --, therefor.

In Column 8, Line 15, in Claim 5, delete "a final" and insert -- the final --, therefor.

In Column 8, Line 18, in Claim 6, delete "images," and insert -- images; --, therefor.

In Column 8, Lines 31-36, in Claim 6, delete "wherein each…fused images." and insert -- wherein the single fused image for the each predetermined channel includes an available wavelength bandwidth proportional to a number of fused images in the single fused image for the each predetermined channel and a total wavelength bandwidth of the single fused image. --, therefor.

In Column 8, Line 47, in Claim 11, delete "the first and second plurality" and insert -- the plurality --, therefor.

Signed and Sealed this
Thirtieth Day of June, 2015

Michelle K. Lee
*Director of the United States Patent and Trademark Office*